United States Patent Office 3,704,307
Patented Nov. 28, 1972

3,704,307
PROCESS FOR THE PREPARATION OF 3-CHLORO-4-METHOXY-PHENYLISOCYANATE
Wilfried Zecher, Cologne, Engelbert Kuhle, Bergisch Gladbach, and Hans Holtschmidt, Leverkusen, Germany, assignors to Farbenfabriken Bayer Aktiengesellschaft, Leverkusen, Germany
No Drawing. Filed Dec. 5, 1969, Ser. No. 882,747
Claims priority, application Germany, Dec. 12, 1968, P 18 14 251.3
Int. Cl. C07c *119/04*
U.S. Cl. 260—453 P   10 Claims

ABSTRACT OF THE DISCLOSURE

Chlorinating 4-methoxy-phenylisocyanate with a chlorinating agent, e.g. elementary chlorine, at a temperature of about —10 to 140° C., optionally in the presence of an inert solvent, e.g. a chlorinated hydrocarbon or thionyl chloride, to form the known 3-chloro-4-methoxy-phenylisocyanate which is a valuable intermediate for the production of herbicides.

---

The present invention relates to and has for its object an unobvious process for the production of 3-chloro-4-methoxy-phenylisocyanate which is known and which can be used as intermediate for the production of herbicides.

It is known that phenylisocyanate is in general chlorinated in the 2- and 4-position of the nucleus by using elementary chlorine (compare Ann. 562, 91 (1949)). It is also known that anisole is in general chlorinated in the 2- and 4-position when elementary chlorine is used as chlorinating agent (compare Chem. Soc. 123, 1425 (1923) and J. Appl. Chem. 3, 409 (1953)).

It is furthermore known that 3-chloro-4-methoxy-phenyl-isocyanate can be prepared by reacting 3-chloro-4-methoxy-aniline with phosgene (compare U.S. patent specification 2,689,861).

It has now been found in accordance with the present invention that 3-chloro-4-methoxy-phenylisocyanate of the formula:

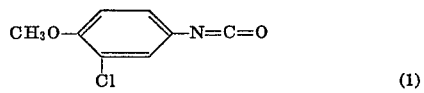

may be obtained in a smooth reaction in a favorably high yield, by the process which comprises chlorinating 4-methoxy-phenylisocyanate of the formula:

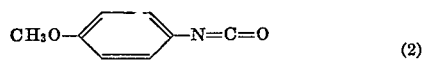

(optionally in the presence of an inert organic or inorganic liquid solvent and in the presence of a catalyst) with a chlorinating agent at —10 to 140° C.

It is very surprising that the chlorination only takes place in the 3-position. In view of the fact that both substituents direct the chlorine to the respective ortho-position, since the respective para-positions are blocked, a mixture of 2- and 3-chloro-4-methoxy-phenylisocyanate was to be expected. The exclusive formation of 3-chloro-4-methoxy-phenylisocyanate according to the invention is unobvious and was not to be foreseen.

The reaction is generally carried out with elementary chlorine but reagents which split off halogen such as sulphuryl chloride can also be employed.

The 4-methoxy-phenylisocyanate of Formula 2 to be used as starting substance is well known [Bull. Chim. [3] 21,956 (1899)]. In general, the reaction is carried out in such a way that the chlorination reactant is passed into, or added dropwise to, the optionally dissolved 4-methoxy-phenylisocyanate at temperatures of —10 to 140° C., preferably of 10 to 100° C., and that the mixture is subsequently stirred until the reaction has ended. The product may be purified by distillation of the resulting reaction mixture.

Suitable solvents include chlorinated hydrocarbons, such as chlorinated lower aliphatic hydrocarbons, chlorinated aromatic hydrocarbons, and mixtures thereof, e.g. chloroform, carbon tetrachloride, trichloroethylene, trichlorobenzene, and mixtures thereof, and also thionyl chloride.

The reaction can be carried out continuously or batchwise.

In order to accelerate the reaction and to assist in obtaining a product which is a single substance, the usual nuclear halogenation catalysts can be employed, for example iodine, ferric chloride, stannic chloride and antimony pentasulphide.

The 3-chloro-4-methoxy-phenylisocyanate obtained according to the process of the invention can be used as intermediate for the manufacture of herbicides. This may be done in a manner known per se. It can for example be converted in the usual manner by reaction with dialkylamines such as dimethylamine into the corresponding ureas which possess a herbicidal action (cf. Belgian Pat. 689,673).

The process of the present invention may be illustrated without limitation by the following examples.

EXAMPLE 1

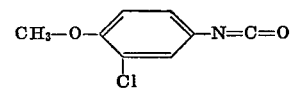

225 g. of 4-methoxy-phenylisocyanate and 8 g. of iodine as the catalyst are dissolved in 200 ml. of chloroform. 113 g. of chlorine are then introduced at 60° C. and thereafter the mixture is stirred for a further half-hour at this temperature. The chloroform is now distilled off, the residue is degassed under a waterpump vacuum, and 210 g. of 3-chloro-4-methoxy-phenylisocyanate are obtained by distillation at 15 mm./136–140° C.

EXAMPLE 2

To 149 g. (1 mole) of 4-methoxy-phenylisocyanate are added dropwise at 60° C. 142 g. (1.05 mole) of sulfuryl chloride, and thereafter the reaction mixture is stirred for a further hour at this temperature. Then the mixture is heated to 100° C. until the evolution of hydrogen chloride has ceased. 126 g. of 3-chloro-4-methoxy-phenylisocyanate are obtained by distillation at 14 mm./136–138° C.

EXAMPLE 3

According to Example 2, a solution of 149 g. of 4-methoxy-phenylisocyanate in 150 cc. chloroform is reacted with 142 g. of sulfuryl chloride at 80° C. 62 g. of 3-chloro-4-methoxy-phenylisocyanate are obtained by distillation at 14 mm./135–138° C.

EXAMPLE 4

According to Examples 2 and 3, a solution of 149 g. of 4-methoxy-phenylisocyanate in 200 cc. chloroform is reacted with 142 g. of sulfuryl chloride at 25–30° C., whereafter the mixture is stirred for a further 2 hours at 40° C. 119 g. of 3-chloro-4-methoxy-phenylisocyanate are obtained by distillation at 13 mm./132–135° C.

What is claimed is:
1. Process for the production of 3-chloro-4-methoxy-phenylisocyanate to the exclusion of isomers which comprises contacting 4-methoxy-phenylisocyanate with a chlorinating agent at —10 to 140° C. in the presence of an inert liquid solvent.

2. Process according to claim 1 wherein said chlorination is carried out in the presence of a chlorinated hydrocacrbon as inert organic liquid solvent.

3. Process according to claim 2 wherein said solvent is selected from the group consisting of chlorinated lower aliphatic hydrocarbons, chlorinated aromatic hydrocarbons, and mixtures thereof.

4. Process according to claim 1 wherein said solvent is thionyl chloride.

5. Process according to claim 1 wherein a nuclear halogenation catalyst is used to accelerate the reaction.

6. Process according to claim 5 wherein said catalyst is selected from the group consisting of iodine, ferric chloride, stannic chloride, and antimony pentasulphide.

7. Process according to claim 1 wherein said chlorination is carried out at 10 to 100° C.

8. Process according to claim 1 wherein said chlorinating agent is elementary chlorine.

9. Process according to claim 1 wherein said chlorinating agent is sulphuryl chloride.

10. Process according to claim 1 wherein the 3-chloro-4-methoxy-phenylisocyanate formed is recovered in purified form by distillation of the resulting reaction mixture.

References Cited

UNITED STATES PATENTS

| | | | |
|---|---|---|---|
| 2,168,260 | 8/1939 | Heisel et al. | 260—694 X |
| 2,945,875 | 7/1960 | Tazuma | 260—453 |
| 2,974,163 | 3/1961 | Julian et al. | 260—453 X |

OTHER REFERENCES

Migrdichian: Organic Synthesis, vol. 2, Reinhold Publishing Corp., New York, pp. 1252–7 (1957).

LEWIS GOTTS, Primary Examiner

D. H. TORRENCE, Assistant Examiner

U.S. Cl. X.R.

71—120; 260—453 AR, 553 A, 694